United States Patent [19]
Kunysz et al.

[11] Patent Number: 5,995,044
[45] Date of Patent: Nov. 30, 1999

[54] METHOD AND APPARATUS FOR CHARACTERIZING MULTIPATH INTERFERENCE IN CIRCULARLY POLARIZED SIGNALS

[75] Inventors: Waldemar Kunysz; Thomas J. Ford; Janet Neumann, all of Calgary, Canada

[73] Assignee: NovAtel, Inc., Calgary, Canada

[21] Appl. No.: 09/071,311

[22] Filed: May 1, 1998

[51] Int. Cl.[6] .......................... H01Q 21/06; H01Q 21/24
[52] U.S. Cl. ........................................ 342/363; 342/365
[58] Field of Search ................................ 342/363, 365

[56] References Cited

U.S. PATENT DOCUMENTS

| | | |
|---|---|---|
| 3,540,045 | 11/1970 | Taylor . |
| 3,883,872 | 5/1975 | Fletcher et al. . |
| 5,200,756 | 4/1993 | Feller ........................................ 343/700 |
| 5,298,908 | 3/1994 | Piele ......................................... 342/363 |
| 5,325,403 | 6/1994 | Siwiak et al. . |
| 5,495,499 | 2/1996 | Fenton et al. ............................. 375/205 |
| 5,534,882 | 7/1996 | Lopez ....................................... 343/891 |
| 5,615,232 | 3/1997 | Van Nee ................................... 375/346 |
| 5,691,727 | 11/1997 | Cyzs ......................................... 342/361 |

*Primary Examiner*—Theodore M. Blum
*Attorney, Agent, or Firm*—Cesari and McKenna

[57] ABSTRACT

A GPS receiver embodying the invention includes a first channel that preferentially processes line-of-sight signals and a second channel that preferentially processes multipath signals. It then compares the results to determine if the multipath has degraded the results of the processing of the line-of-sight signals.

2 Claims, 2 Drawing Sheets

METHOD AND APPARATUS FOR CHARACTERIZING MULTIPATH INTERFERENCE IN CIRCULARLY POLARIZED SIGNALS

FIELD OF THE INVENTION

This invention relates generally to receivers for circularly polarized signals such as those used in ranging systems, and in particular to such a receiver that provides an indication of the degree of multipath interference.

BACKGROUND OF THE INVENTION

Ranging systems such as the United States' Global Positioning System (GPS) and the Russian Global Navigation System (GLONASS) allow a user to precisely determine his/her latitude, longitude and elevation. Receivers accomplish ranging by decoding precisely-timed ranging signals transmitted by a group of earth-orbiting satellites. These signals are modulated with a unique, high frequency pseudorandom noise (PRN) code, and the receiver uses the timing of these codes to determine the transmission time, and thus the distance, from each satellite.

In the ideal communications channel only the direct, or line-of-sight, signal is present at the receiver. The receiver correlates the line-of-sight signal with a locally generated PRN code and uses the correlation function peak to precisely determine the transmission time. In general, reflections of the transmitted signals may also be received. Specifically, the signals may also arrive at the receiver antenna after reflection from the earth's surface and from various man-made structures. These signals, known collectively as multipath, are combined with the line-of-sight signal at the receiver.

The time delay of multipath signals relative to the line-of-sight signal can result in a degradation of ranging accuracy. Specifically, it may distort the correlation function, thereby shifting the apparent peak of the function. The severity of the resulting inaccuracy is a function of the satellite and receiving antenna positions relative to the various reflecting objects. Methods have been developed to counter the effect of multipath on ranging system performance. For example, U.S. Pat. No. 5,495,499 describes a narrow correlator that reduces the effect of multipath on the range estimate, and U.S. Pat. No. 5,615,232 discloses an iterative curve-matching mechanism to largely eliminate the multipath contribution to the correlation function.

These methods have various limitations and restrictions in resolving the effect of multipath, however, and the user of a GPS positioning system may not be aware of the extent to which multipath interference is degrading the accuracy of the range estimates. For example, a difference in the timing and carrier phases of the line-of-sight signal and the multipath signals may exist, even when distortion of the shape of the correlation function is minimal. The difference results in a shift of the correlation peak, and an associated degradation of the ranging accuracy. This condition may occur when the multipath is produced by "near" reflectors, i.e. when the differences in the relative path lengths of the line-of-sight and multipath signals are less than a significant fraction of a PRN chip.

What is needed is a simple and low-cost system for characterizing errors in a received signal due to multipath interference, in particular, when the interference is produced by "near" reflectors. The results can be used to provide the user with an indication of received signal quality and the presence of multipath. The system should not unduly increase the cost or size of currently available receiving units.

SUMMARY OF THE INVENTION

A GPS receiver embodying the invention includes a first channel that preferentially processes line-of-sight signals and a second channel that preferentially processes multipath signals. It then compares the results to determine if the multipath has degraded the results of the processing of the line-of-sight signals.

The GPS satellites transmit right-hand circularly polarized (RHCP) signals. When the multipath signals are reflected, they usually either reverse polarity to become left-hand circularly polarized (LHCP) signals or become linearly polarized signals, depending on the characteristics of the reflectors. In the presence of multipath interference, a GPS receiver may receive a composite of the direct signals from the satellite and reflected signals, that is, a composite of RHCP, LHCP and linearly polarized signals. The conventional GPS receiver antenna unit is configured to provide a channel sensitive primarily to RHCP signals. Ideally, only right-hand signals would be present in this channel and left-hand signals would be largely eliminated. Linearly polarized signals and LHCP signals, however, are not completely rejected by the receiving antenna unit. Therefore, some multipath components will usually be combined with the line-of-sight signals in the channel, thereby degrading receiver performance.

We have modified the receiver antenna unit to provide a second channel that preferentially passes LHCP signals. This channel is thus, in general, more sensitive to multipath components than to the line-of-sight signals. The signals in the right-hand channel (multipath attenuated with respect to the line-of-sight signal) and left-hand channel (line-of-sight signal attenuated with respect to the multipath) channels are separately processed in normal fashion. The resulting range, signal strength and/or carrier phase estimates are then compared to detect the presence of multipath and to determine the degree to which it has degraded the readings obtained from the right-hand channel.

Although it is possible to separately receive the RHCP and LHCP components using two antennas, a single dual-terminal antenna is preferred in order to ensure that the signals in each channel originate from a common phase center. A 90° hybrid coupler separates the two antenna signals so as to produce a right-hand signal at one output port and a left-hand signal at a second output port.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
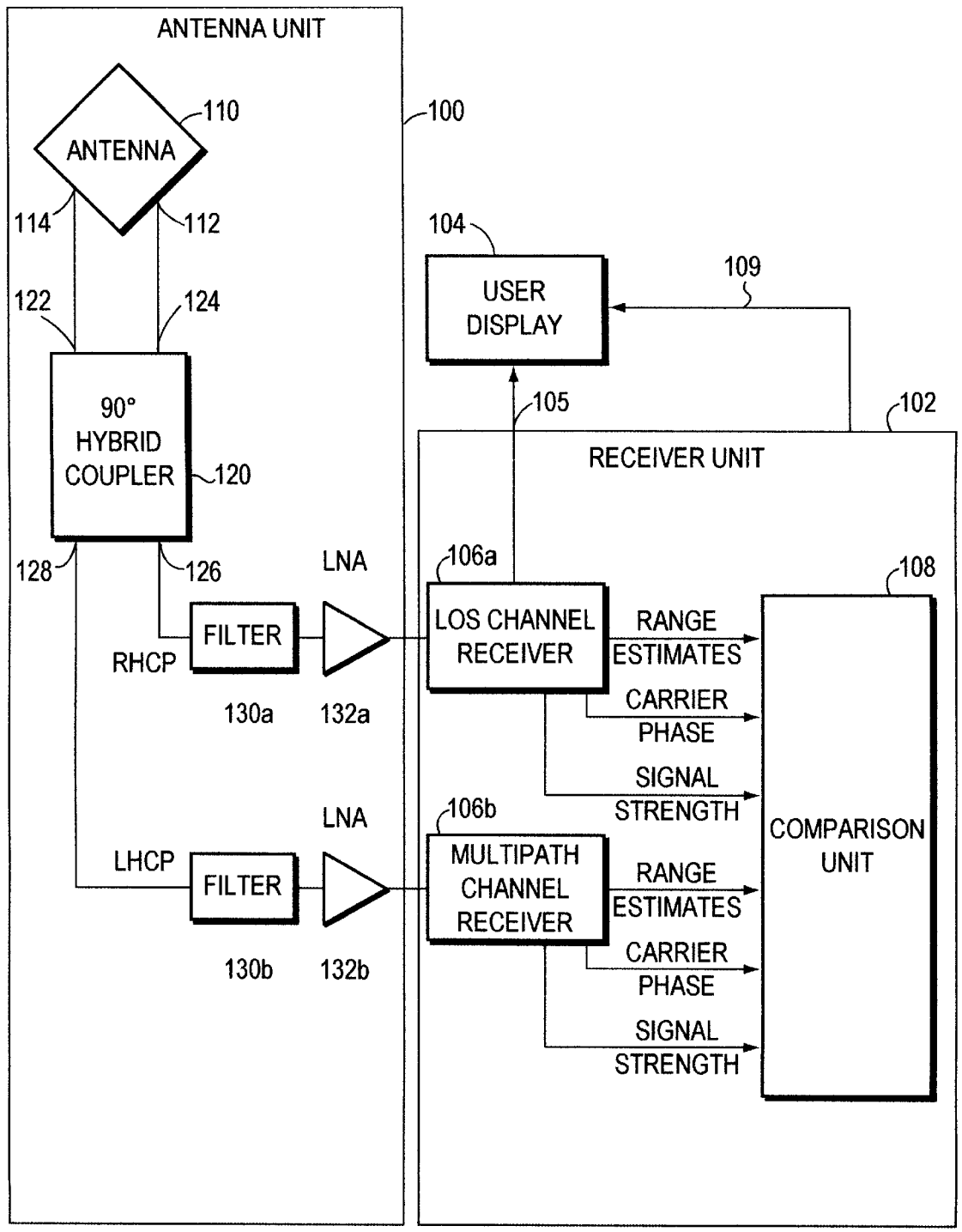
FIG. 1 is a diagram of a ranging system embodying the invention.

As shown in FIG. 1, a ranging system is comprised of an antenna unit 100, a receiver unit 102 and a user display 104. The antenna unit 100 may be a modified version of the unit described in U.S. Pat. No. 5,200,756 ('756) which is incorporated herein by reference. However, any other type of dual (left-hand and right-hand) circularly-polarized antenna can be used to provide the features of the invention. An antenna element 110 has two terminals 112 and 114, which are connected to the input ports 122 and 124, respectively, of a 90° hybrid coupler 120. The signals at the antenna terminals 112 and 114 are combined by the coupler 120 to provide a right-hand signal at a first output port 126, and a left-hand signal at a second output port 128. The left-hand signal is processed in a fashion similar to the right-hand signal. This differs from the treatment of the left-hand signal by the '756 antenna unit, which terminates the left-hand signal at output port 128 with a matched load.

The antenna unit 100 includes filters 130a and 130b and low noise amplifiers 132a and 132b for the signals from ports 126 and 128. The resulting output signals are passed to receiver unit 102. The receiver unit 102 may comprise a Line-Of-Sight (LOS) channel receiver 106a, a multipath channel receiver 106b, and a comparison unit 108. The LOS channel receiver 106a and the multipath channel receiver 106b are identical, and we describe below the operations of the LOS channel receiver 106a. It will be understood that, instead of two separate receivers, a single receiver may be used to separately process the signals from both the LOS and multipath channels.

The LOS receiver 106a down-converts and digitizes the received signals to produce inphase (I) and quadrature (Q) samples. The I and Q samples are used to generate range, signal strength and carrier phase estimates from various GPS satellites. Range estimates are calculated by correlating the received signals with locally generated PRN codes. An ideal correlation function 202 is shown in graph A of FIG. 2. The LOS channel receiver 106a estimates the range by locating the peak 203 of the correlation function 202, and it then uses the range estimates to calculate a position output signal 105 which is presented on a user display 104. When the multipath interference is negligible, the correlation function 202 will be undistorted and the position will be accurate and error-free.

Figure 2:
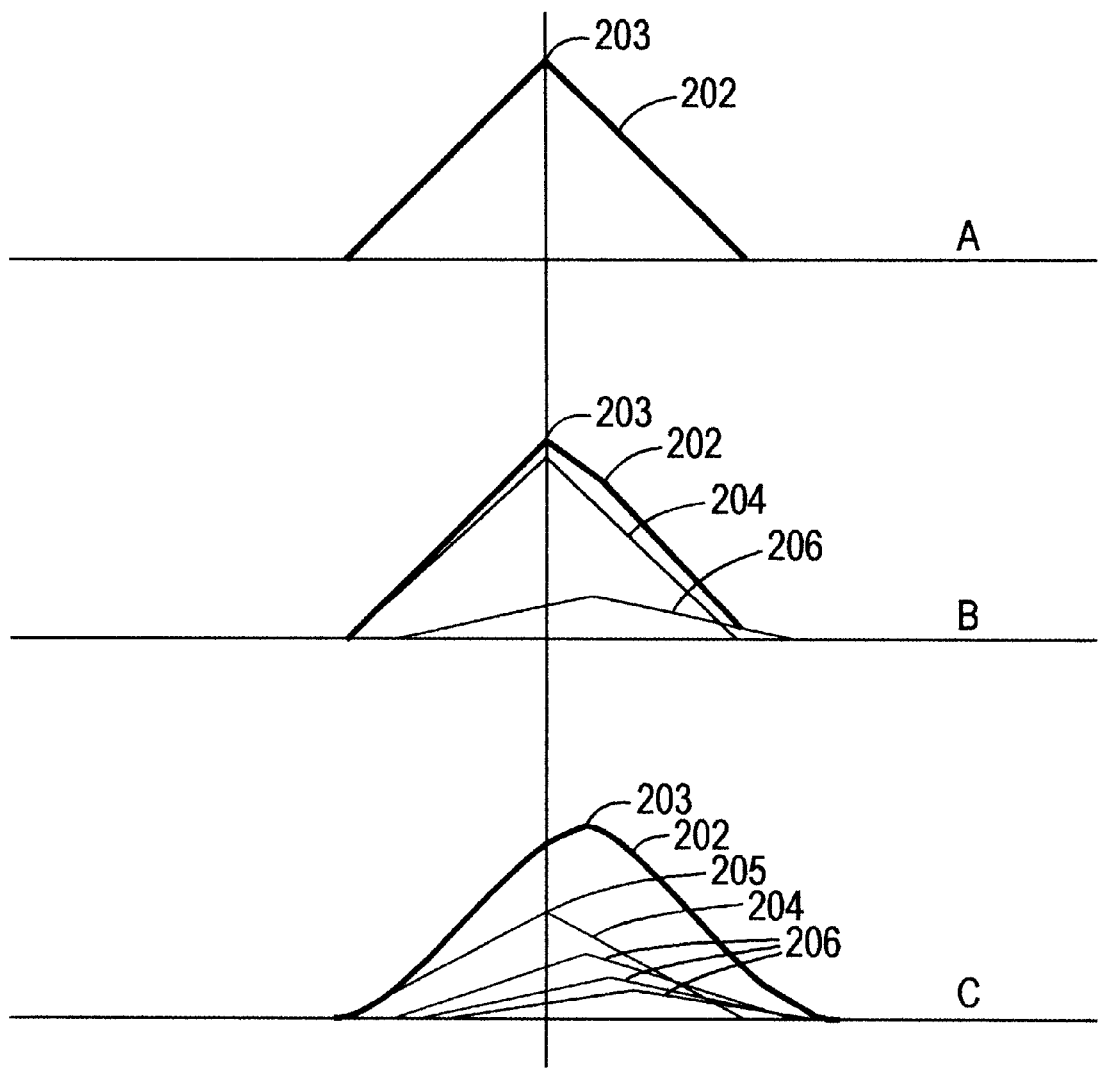
FIG. 2 are graphs of receiver correlation functions.

Even a small amount of multipath interference may distort the correlation function 202 as shown in graph B of FIG. 2. The correlator function 202 includes contributions from both the line-of-sight signal correlation function 204 and the multipath signal correlation function 206. The LOS channel receiver 106a uses processing methods, such as the narrow correlation and iterative curve-matching described in U.S. Pat. Nos. 5,495,499 and 5,612,232, respectively, and incorporated herein by reference, to successfully locate the peak 203 of the correlation function 202 and calculate an accurate range estimate in the presence of this distortion.

More significant multipath interference, however, may degrade the range estimates. For example, the narrow correlator may not be able to accurately resolve the location of the peak, or may lock onto a peak 203 of the correlation function 202 that has been time-shifted by the multipath inference, as shown in graph C of FIG. 2. The iterative curve-matching mechanism operates to largely eliminate the multipath distortion from the received correlation function 202 of graph C and to precisely determine the location of the peak 205 of the line-of-sight correlation function 204. In some cases, however, the multipath signals may not appreciably distort the correlation function, yet a difference in the relative carrier phases of the line-of-sight and multipath signals may still produce a small time-shift of the correlation function that introduces an error into the range estimate. The iterative curve-matching mechanism may not be capable of detecting and correcting this error. Similarly, the narrow correlator cannot detect such a time shift and a user of either system will not be aware that multipath interference has introduced an error into the range estimate.

When sufficiently high multipath signal levels are present, the multipath channel receiver 106b will be able to lock onto and track the composite GPS signals. The multipath channel receiver 106b produces I and Q samples from which range, signal strength and carrier phase may be estimated. Both the LOS channel receiver 106a and the multipath channel receiver 106b send their estimates to the comparison unit 108. The comparison unit 108 compares these estimates to determine whether the multipath inference has introduced a significant error into the range estimates and outputs to user display 104 an error indicator signal 109 that warns the user of an error in the position output signal 105. In the preferred embodiment, the functions performed by the comparison unit 108 are implemented in software by a processor that also performs correlation, estimates range, signal strength and carrier phase, and calculates a position.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A receiver in a satellite ranging system comprising:
   (a) an antenna for receiving signals that include one-hand circularly polarized transmitted signals, opposite-hand circularly polarized multipath interference and linearly polarized multipath interference;
   (b) means for preferentially deriving right-hand signals from right-hand circularly polarized (RHCP) signals received by the antenna;
   (c) means for preferentially deriving left-hand signals from left-hand circularly polarized (LHCP) signals received by the antenna;
   (d) means for separately processing said right-hand and left-hand signals to provide right-hand and left-hand output data corresponding to individual sources; and
   (e) means for comparing right-hand and left-hand output data to produce a signal indicating a result of the comparison;
   wherein the right-hand and left-hand output data comprise carrier phase, signal strength, and range estimates.

2. The receiver of claim 1 wherein said transmitted signal includes signals from a plurality of sources.

* * * * *